Sept. 15, 1953      A. J. MILLER      2,652,497
TEMPERATURE MEASUREMENT
Filed June 16, 1950
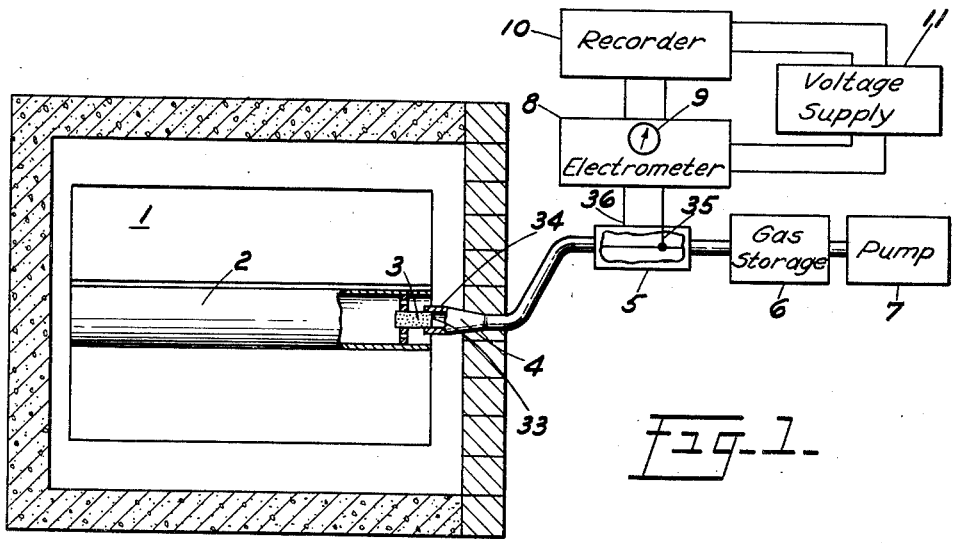
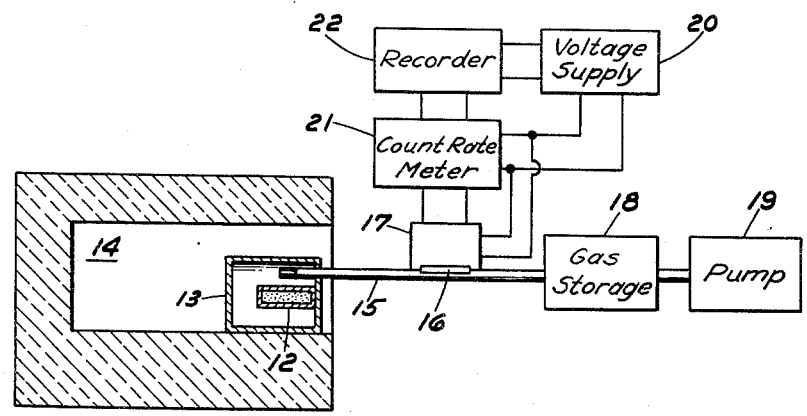
INVENTOR.
Arthur J. Miller
BY Roland A. Anderson
ATTORNEY Patented Sept. 15, 1953

2,652,497

UNITED STATES PATENT OFFICE 2,652,497

TEMPERATURE MEASUREMENT

Arthur J. Miller, Oak Ridge, Tenn., assignor to the United States of America as represented by the United States Atomic Energy Commission Application June 16, 1950, Serial No. 168,636

7 Claims. (Cl. 250—43.5)

The present invention relates to the measurement of temperature, and especially to methods and apparatus for measuring and indicating very high temperatures under conditions where thermocouples and optical pyrometers may be of only limited effectiveness.

At elevated temperatures of above 1800° F., the few metal thermocouples which can withstand the intense heat are subject to rapid deterioration under oxidizing conditions obtaining for most applications. At still higher temperatures, such as may exist inside a high temperature nuclear reactor, even the best metal thermocouples fail.

In measuring temperatures inside a nuclear reactor the detector element must be relatively insensitive to the extremely high-energy radiations liberated by the fission process. The electrical properties of ceramic semi-conductors are known to be greatly altered under prolonged radiation bombardment, so that thermocouples would be of doubtful accuracy, even if they could be sufficiently thermally shielded to withstand the high temperature obtaining. Optical pyrometry is not feasible, because thick shields necessarily enclose reactors to attenuate harmful radiations.

With a knowledge of the problems of the prior art, applicant has as an object of his invention provision of novel methods and apparatus for measuring temperature.

A further object of the invention is to provide methods and apparatus especially adapted for measuring elevated temperatures.

Another object of the invention is to provide methods and apparatus for measuring and indicating temperatures inside a nuclear reactor, or in intense fields of nuclear radiations.

Yet another object of the present invention is the provision of methods and apparatus especially adapted for measuring and continuously recording high temperatures.

Other objects and advantages of the invention will be apparent from the following description of the invention, when read in connection with the appended drawings, in which:

Fig. 1 represents schematically a preferred embodiment of the novel apparatus disposed within a nuclear reactor, and Fig. 2 represents another embodiment of the invention useful in high-temperature furnaces and other equipment not necessarily associated with nuclear reactors.

Referring now to Fig. 1, the reactor 1 may contain several fuel rods 2, the temperature of which is desired. These rods may be hollow cylinders of graphite containing in their walls uranium enriched in the 235 isotope, or other suitable fissionable material, and coated with a refractory coating, such as silicon carbide, for example. The capsule 3, having a gas-permeable outer end wall 33 and filled, preferably under greater than atmospheric pressure, with a quantity of a radioactive gas, is inserted in a support in one end of the rod 2. Tube 4 has a flared extremity 34 which may be press fit tightly around the exposed end of capsule 3, to lead the gas which escapes the capsule away from the region of intense radiation and heat and through an ionization chamber or counter 5. The chamber 5 may be of any convenient design, and may, for example, include a pair of spaced, oppositely charged electrodes to which leads 35, 36 are connected. For use at very high temperatures, normal construction materials in the chamber may be replaced by refractory materials such as molybdenum or zirconium. Alternatively, the gas may be led past a detector, such as a Geiger-Mueller, scintillation, or other known counter, instead of through the chamber. A small pump 7 may be installed in the system to pull the escaped gas through the tube 4 and chamber 5. From the chamber, the gas may be exhausted to the atmosphere, or fed to a storage container 6, or otherwise suitably eliminated from the system. The electrometer 8 serves to measure the ionization current occurring between electrodes of the chamber 5 in the well-known manner, and may include a calibrated meter 9 and/or recorder 10 of the conventional type for indicating and recording the radiation intensity, which will be dependent upon the temperature of the capsule. Voltage supply 11 is provided to energize the several electrical components. A suitable ionization chamber, for use in the flow system, is described in MDDC-63, Recording Ionization Chamber for Traces of Radioactive Gases, by Nier et al., and utilizes $UF_6$ gas.

In Fig. 2, the permeable probe 12 is sealed in metal can 13 placed inside the oven or furnace 14. The probe may be a hollow thin metal closed cylinder, filled with a compressed radioactive gas. The container 13 may be fitted with a pipe or tube 15 which conducts the escaped radioactive gas away from the oven and adjacent the very thin window 16, which may form both a window in the wall of tube 15 and the radiation entrance for counter 17, and into storage container 18. Alternatively, opposing the window of the counter 17, the wall of the tube 15 may contain a thin window such as mica to allow passage of radiation from inside the tube into the counter volume—the window thicknesses depending upon the energy of radiation of the particular gas chosen. A small vacuum pump may draw the gas which escapes the probe 12 out through the tube 15. Voltage supply 20 energizes the counter 17 and count rate meter 21, which may feed a recorder 22 calibrated in degrees centigrade.

According to the broad principles of the invention a permeable container filled with a radioactive gas of known disintegration rate is exposed to the temperature to be measured. The rate of flow of a gas through a porous medium is a function of temperature, and may, for certain materials, be an increasing, substantially exponential function. Therefore, the rate of escape of the radioactive gas through the container walls will change markedly with a change in temperature. Changes in the permeability of the container may be measured and indicated by causing the escaped gas to pass through a gas flow ionization chamber or closely adjacent another known radiation counter, connected to suitable instruments for measuring, indicating, and/or recording the radiation entering the radiation detector per unit time. Since the disintegration rate of the radioactive gas used is known, the rate of gas escape from the container will determine the relative radiation intensity inside the ion chamber. By comparison of the intensities indicated for several known temperatures as observed, for example, with an optical pyrometer, the ionization intensity indicator may be calibrated to show the temperature of the gas container.

The use of a thin metal wall in the capsule end allows for easy fabrication, permits rapid diffusion of the gas molecules through its interstices, and provides a desirable temperature-permeability relation. While metal is to be preferred, the probe may also be constructed of a variety of other materials, under various conditions of use. For example, thin sheets of silica and quartz glasses might be employed at temperatures below their softening point. The material chosen should have good refractory properties to withstand the temperatures to which it is exposed, or be coated with a porous refractory coating. For very high temperatures, up to 2500° C., molybdenum is preferred; for temperatures up to 1400° C. various ferrous metal alloys would be satisfactory.

Various radioactive gases may be employed in the capsule; alternatively, if the temperature to be measured is well above the boiling point of a radioactive liquid or the vaporization temperature of a solid, the liquid or solid substance might be enclosed in the capsule, and the heat from the object monitored used to produce the gas inside the capsule. Radon and carbon of atomic weight 14 in carbon dioxide are convenient suitable radioactive gases. The oxides and halides of phosphorus of atomic weight 32, and the halides of uranium of atomic weight 235 are further examples of radioactive substances which have a gas or vapor phase within contemplated temperature ranges.

The inner end of tube 4 must withstand the same temperature as the capsule; therefore, for elevated temperatures it must possess excellent refractory abilities. Molybdenum, molybdenum carbide, or various metals or ceramics having good refractory coatings known to the art may be employed. The walls of the tube must, of course, be comparatively thick, or the tube must be coated to prevent substantial leakage therethrough by the active gas. Sharp bends forming pockets which might trap the active gas should be avoided, but the tube should be curved to prevent line-of-sight neutron escape from inside the reactor, when used in that connection.

The counter-indicator-recorder system illustrated performs the function of determining and indicating the amount of radiation entering the ionization chamber from the escaping gas per unit time. If the ionization chamber referred to above is employed, a vibrating reed electrometer such as that available from the Applied Physics Company may be used to measure and indicate the chamber current, and may feed a strip-chart recorder such as the Brown "Electronik." Because the output of the electrometer will vary with the temperature of the gas-filled probe, the indicating meter or strip chart may be calibrated in, for example, degrees centigrade.

In another embodiment of the invention useful for measuring the temperature inside a nuclear reactor, the gas contained in the capsule or probe 3 may be a stable gas which, when exposed to the neutrons released in the reactor, becomes radioactive. With a substantially constant neutron flux, the rate of diffusion of the gas will be indicated by the radioactivity measurements as described above. The gas chosen should have a fairly high cross-section for absorbing neutrons for optimum sensitivity of the device, but not so high as to interfere with reactor operations. The bromine isotope of atomic weight 79 and the iodine isotope of atomic weight 127 are examples of gases which would be satisfactory.

When the gas has escaped from the capsule, it may be desirable to flush out the system with an inert gas before inserting a new capsule. Or if only intermittent readings are to be taken, the tube and chamber may be flushed before each reading to guard against any memory effect due to radioactive molecules remaining in the connecting tube.

It is apparent that many changes in the elements employed, such as the radioactive gas, the size and composition of the probe wall, the design of the counter and measuring devices may be made without departure from the spirit of my invention, which is not to be limited to the examples set forth above, but only by the appended claims.

Having thus described my invention, I claim:

1. Apparatus for measuring temperature comprising, in combination, a radioactive gas enclosed in a permeable container, for exposure to said temperature to be measured, means for collecting that portion of said gas which diffuses through the walls of said container, and means for determining the rate of diffusion of said gas comprising means for leading said gas from said collecting means and means for monitoring the radioactivity of said gas, the intensity of radiation indicated by said monitoring means being dependent upon the temperature of said container.

2. Apparatus for measuring temperature comprising, in combination, a probe including an outer envelope, and an inner gas permeable envelope containing a radioactive gas, said probe being exposable to the temperature to be measured, a counter tube adapted to detect radiations from a gas passing therethrough, a conduit connecting the volume between said envelopes to said counter tube, means for moving gas through said conduit and means calibrated to a temperature scale for indicating the radiation intensity in said counter tube.

3. Apparatus for measuring temperature comprising, in combination, an outer envelope, a gas-permeable metal inner envelope containing a radioactive gas therein, a gas flow counter tube, a conduit connecting the volume between said envelopes to the gas entry port of said counter, and calibrated means for determining the radiation intensity detected by said counter from the flow of said radioactive gas therethrough, said intensity being dependent upon the temperature of said metal envelope.

4. Apparatus for determining the temperature inside a high-temperature furnace comprising, in combination, an inner envelope containing a radioactive gas and relatively permeable to said gas, an outer refractory, relatively impermeable envelope surrounding said inner envelope and disposed within said furnace, a radiation monitor, a conduit connecting the volume between said envelopes to said monitor, and calibrated means for determining the radiation intensity in said monitor due to the passage of said gas therethrough, said intensity being an indication of the temperature dependent rate of diffusion of said gas into said volume.

5. In a high-temperature furnace provided with at least one tubular element having a passageway therethrough, an apertured support member disposed within said passageway, an envelope supported by said member and containing a radioactive gas, the exposed wall of said envelope being relatively permeable to said gas, a conduit defining a passageway connecting with said exposed wall, pumping means for causing said gas to flow through said conduit and calibrated means for measuring and indicating the radioactivity of said flowing gas, said radioactivity being a measure of the temperature of said tubular element.

6. The apparatus as claimed in claim 5 wherein the exposed wall of said envelope is metal.

7. Apparatus for measuring temperature in a field of neutron radiations comprising a permeable envelope containing a gas characterized by its property of forming a radioactive gas upon capture of a neutron, means for collecting said radioactive gas which diffuses through said envelope, and means for measuring the rate of diffusion including a radiation monitor for said gas.

ARTHUR J. MILLER.

References Cited in the file of this patent

UNITED STATES PATENTS

| Number | Name | Date |
|---|---|---|
| 1,046,543 | Beatty | Dec. 10, 1912 |
| 1,075,620 | Arndt | Oct. 14, 1913 |
| 1,630,307 | Norwood | May 31, 1927 |
| 2,442,824 | Polye | June 8, 1948 |
| 2,549,621 | Moore | Apr. 17, 1951 |